(12) United States Patent
Sugime

(10) Patent No.: US 11,979,196 B2
(45) Date of Patent: May 7, 2024

(54) OPTICAL TRANSMISSION POWER SUPPLY CABLE

(71) Applicant: KYOCERA CORPORATION, Kyoto (JP)

(72) Inventor: Tomonori Sugime, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 172 days.

(21) Appl. No.: 17/626,814

(22) PCT Filed: Jul. 9, 2020

(86) PCT No.: PCT/JP2020/026798
§ 371 (c)(1),
(2) Date: Jan. 13, 2022

(87) PCT Pub. No.: WO2021/024688
PCT Pub. Date: Feb. 11, 2021

(65) Prior Publication Data
US 2022/0352992 A1 Nov. 3, 2022

(30) Foreign Application Priority Data
Aug. 2, 2019 (JP) .................................. 2019-142685

(51) Int. Cl.
*H04B 10/80* (2013.01)
*G02B 6/42* (2006.01)
*H02J 50/30* (2016.01)

(52) U.S. Cl.
CPC ......... *H04B 10/806* (2013.01); *G02B 6/4202* (2013.01); *H02J 50/30* (2016.02); *H04B 10/807* (2013.01)

(58) Field of Classification Search
CPC .............................. H04B 10/807; H02J 50/30
See application file for complete search history.

(56) References Cited

U.S. PATENT DOCUMENTS

| 8,358,893 | B1 | 1/2013 | Sanderson et al. |
| 2014/0270789 | A1* | 9/2014 | Coffey ............... H04B 10/2575 398/116 |
| 2015/0335231 | A1* | 11/2015 | Van Der Mark ...... A61B 5/318 600/407 |

FOREIGN PATENT DOCUMENTS

| JP | H02301233 | A | 12/1990 |
| JP | 2008193327 | A | 8/2008 |
| JP | 2010135989 | A | 6/2010 |
| JP | 201527020 | A | 2/2015 |
| JP | 2015536195 | A | 12/2015 |
| JP | 2019041524 | A | 3/2019 |
| WO | 2014072891 | A1 | 5/2014 |

* cited by examiner

*Primary Examiner* — Ryan Johnson
(74) *Attorney, Agent, or Firm* — HAUPTMAN HAM, LLP

(57) ABSTRACT

An optical transmission power supply cable includes an electric power input terminal, a power sourcing equipment and an optical fiber cable. The power sourcing equipment includes a semiconductor laser that oscillates with electric power input from the electric power input terminal, thereby outputting feed light. The optical fiber cable transmits the feed light from the power sourcing equipment. The optical fiber cable has an electrically insulating property of not conducting electricity in a longer direction thereof.

8 Claims, 7 Drawing Sheets

OPTICAL TRANSMISSION POWER SUPPLY CABLE

RELATED APPLICATIONS

The present application is a National Phase of International Application Number PCT/JP2020/026798, filed Jul. 9, 2020, and claims priority to Japanese Application number 2019-142685, filed Aug. 2, 2019.

TECHNICAL FIELD

The present disclosure relates to optical power supply.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

At present, locations of indoor household electrical appliances, factory facilities, server rooms and so forth are provided with electric power by outlet interfaces (partly directly connected thereto), the electric power being based on electric power supply by electric power companies, and each household electrical appliance or the like receives electric power through a power supply cable inserted into an outlet. If lightning strike or the like occurs, induced lightning may be conducted through the power supply cable, thereby damaging or burning the household electrical appliance or the like connected to the power supply cable.

As a countermeasure, for example, attachment of a lightning surge unit or optical wireless power transmission may be used. A lightning surge unit is effective against specific types (voltage, current) of lightning or when a voltage equal to or higher than a certain voltage is applied, but, in other cases, may be unable to protect a device(s) connected thereto. Meanwhile, optical wireless power transmission has a condition that a device(s) is installed in an area with good visibility.

Solution to Problem

An optical transmission power supply cable of an aspect of the present disclosure includes:
an electric power input terminal;
a power sourcing equipment including a semiconductor laser that oscillates with electric power input from the electric power input terminal, thereby outputting feed light; and
an optical fiber cable that transmits the feed light from the power sourcing equipment,
wherein the optical fiber cable has an electrically insulating property of not conducting electricity in a longer direction thereof.

DESCRIPTION OF EMBODIMENTS

Hereinafter, embodiments of the present disclosure will be described with reference to the drawings.

(1) Outline of System

First Embodiment

Figure 1:
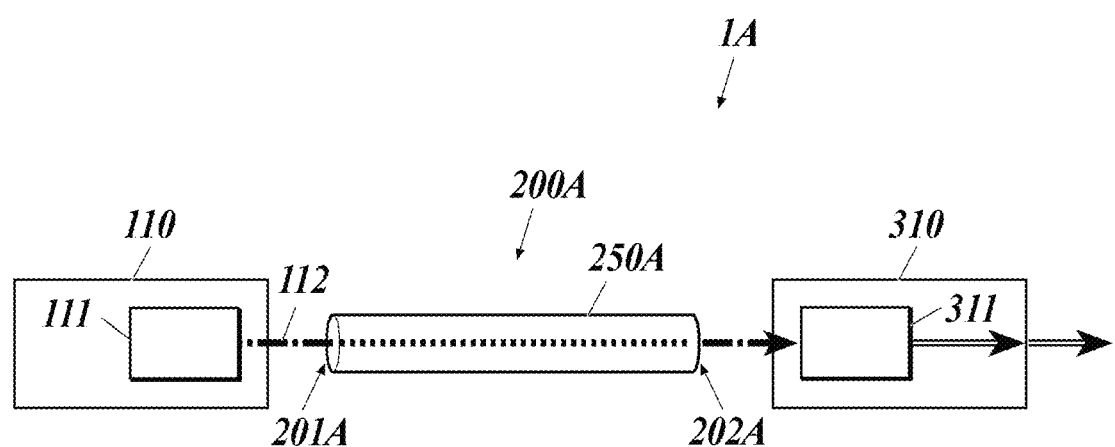
FIG. 1 is a block diagram of a power over fiber system according to a first embodiment of the present disclosure.

As shown in FIG. 1, a power over fiber (PoF) system 1A of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
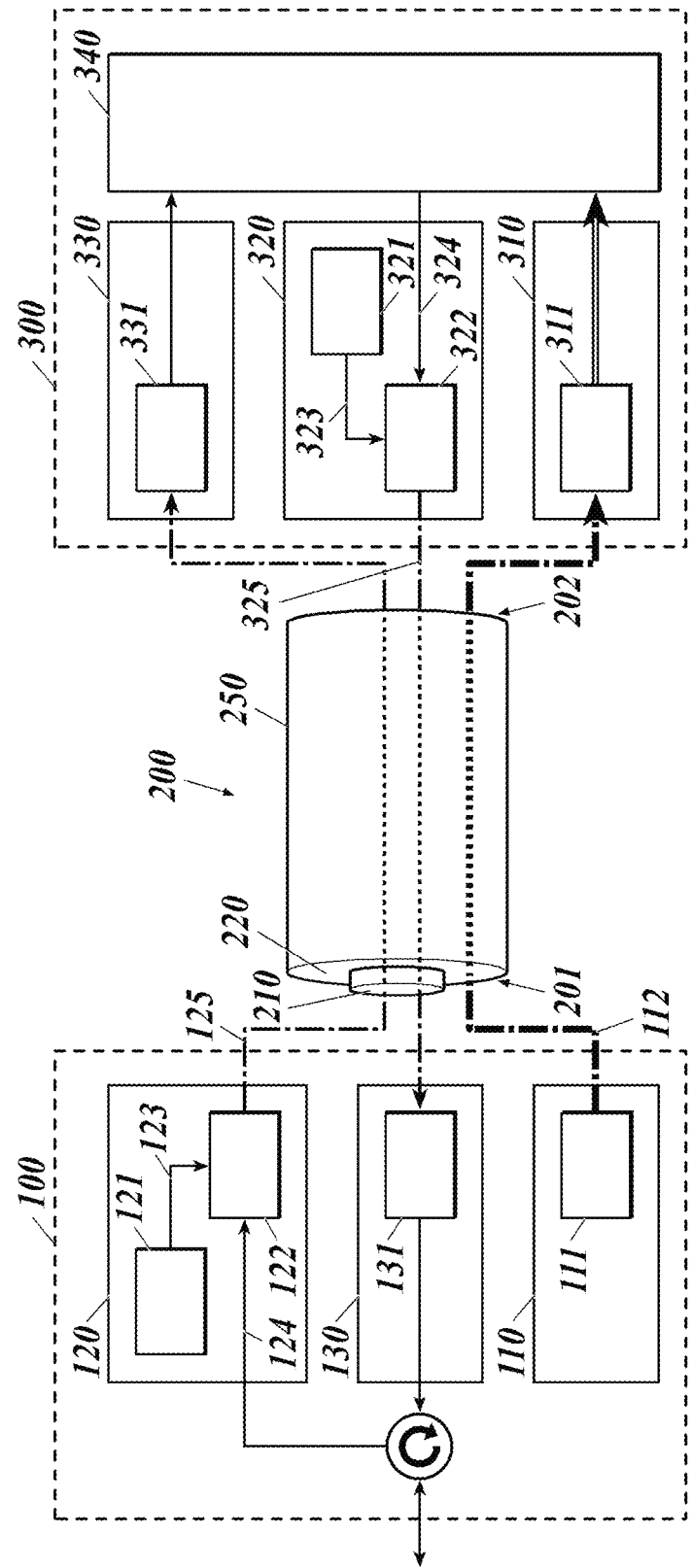
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
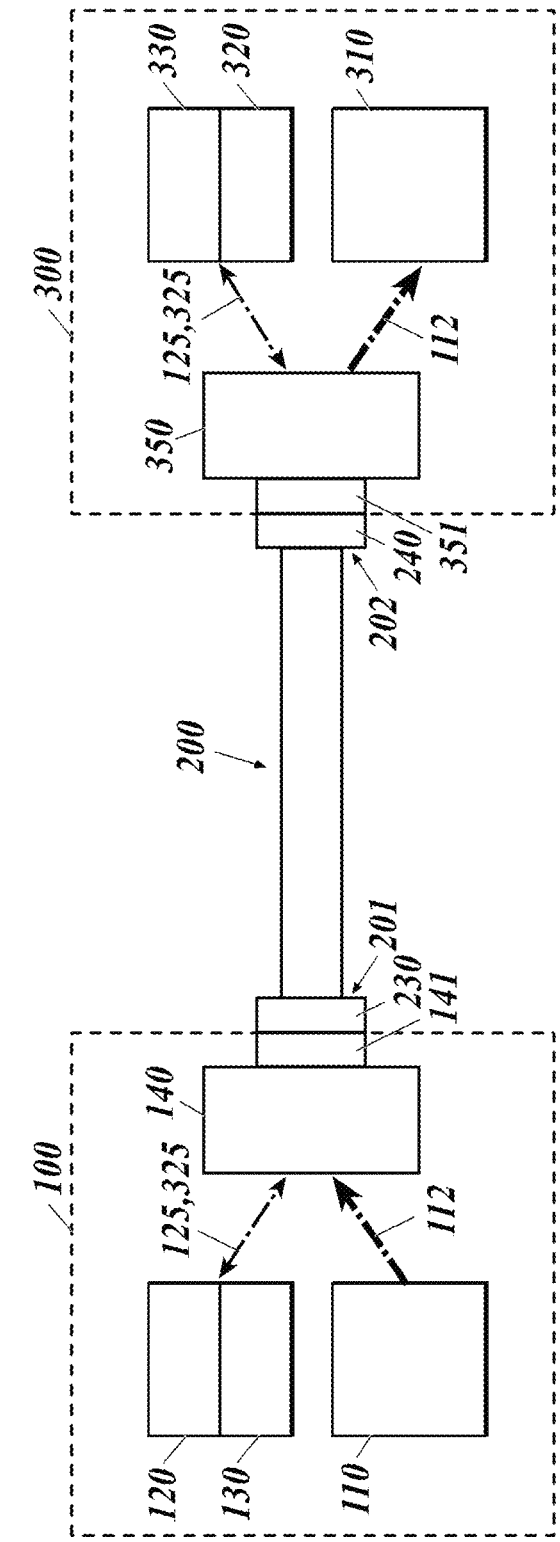
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125, 325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
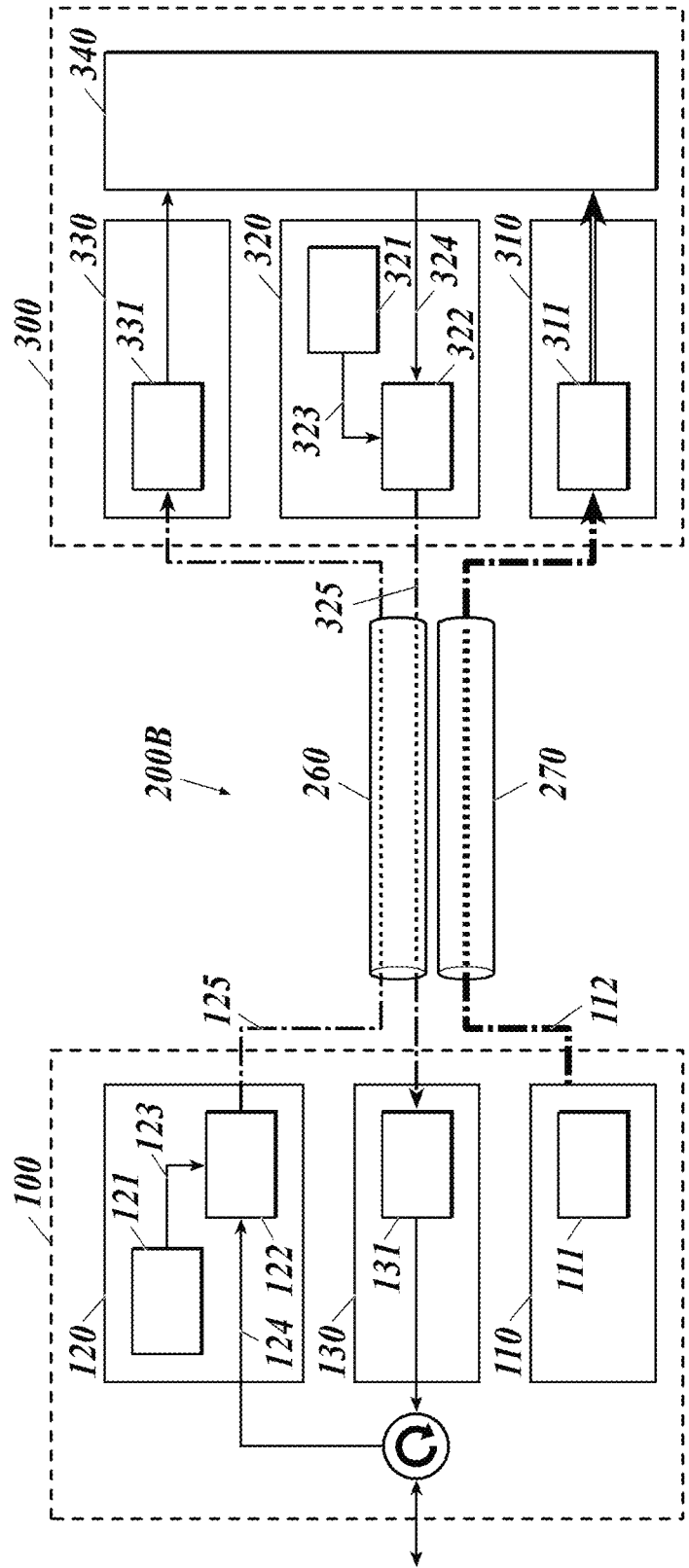
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) Embodiment of Optical Transmission Power Supply Cable

Next, an embodiment of an optical transmission power supply cable will be described with reference to FIG. 5 to FIG. 7 as well as FIG. 1.

As a component including the power over fiber system 1A (shown in FIG. 1) described as the first embodiment, an optical transmission power supply cable 600, which is described below, is embodied.

Figure 5:
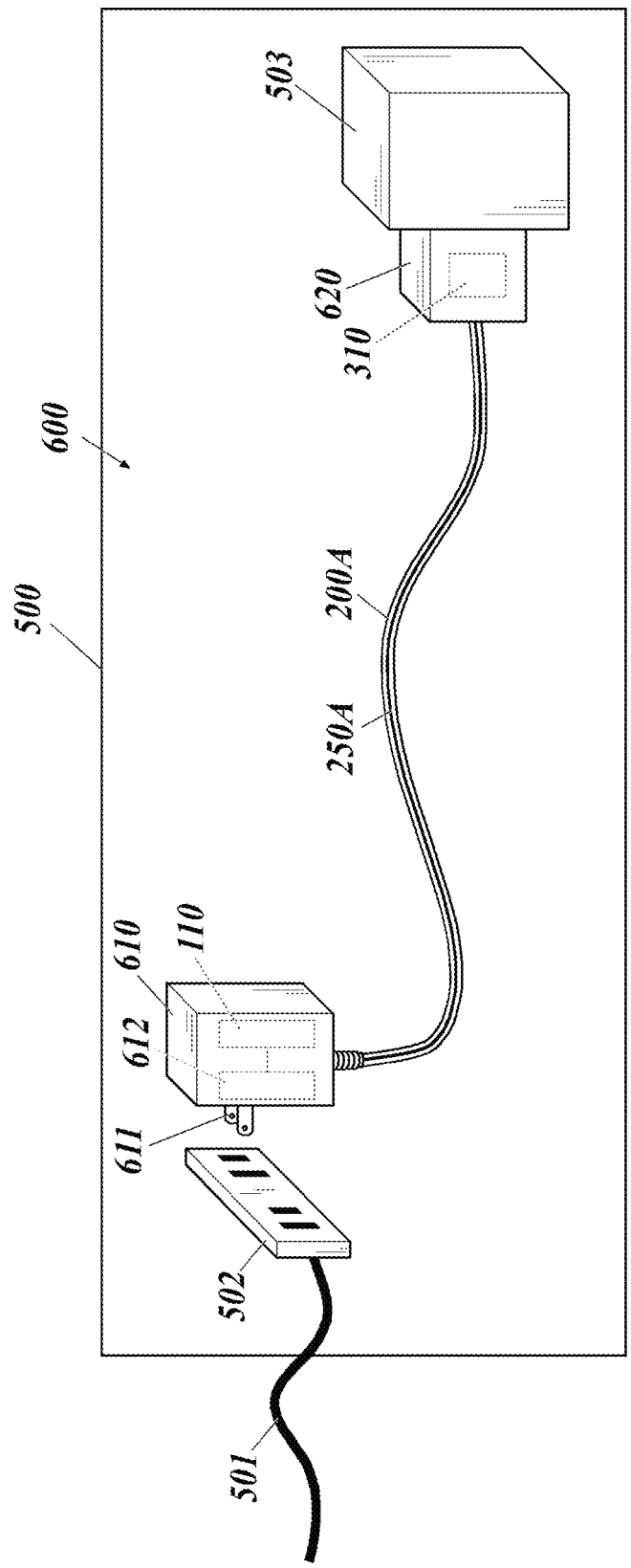
FIG. 5 is a schematic view of an optical transmission power supply cable being used indoors, showing its unconnected state to an AC outlet.

As shown in FIG. 5, an AC (alternating current) source (AC 100 V) is drawn into a building 500 by an AC electrical cable 501, and an AC outlet 502 is installed in the wall or the like of the building 500. In addition, an electrical device 503 is provided in the building 500.

The optical transmission power supply cable 600 includes an input-side end unit 610, an output-side end unit 620, and an optical fiber cable 200A that connects the input-side end unit 610 and the output-side end unit 620. As described above, the optical fiber cable 200A includes an optical fiber 250A that forms a transmission path of feed light. Hence, the optical fiber cable 200A transmits feed light from a power sourcing equipment 110 to a powered device 310.

The input-side end unit 610 includes an electric power input terminal 611 that is integrated therewith. The electric power input terminal 611 is connected to the AC outlet 502. That is, the electric power input terminal 611 is a terminal that is connected to the AC source.

The input-side end unit 610 further includes the power sourcing equipment 110 described above. Hence, the electric power input terminal 611 and the power sourcing equipment 110 are integrated and disposed at the input-side end. The input-side end unit 610 further includes an electric power converter 612 that converts AC power input through the electric power input terminal 611 into DC (direct current) power. The DC power output by the electric power converter 612 drives the power sourcing equipment 110.

The output-side end unit 620 includes the powered device 310 described above. The powered device 310 outputs DC power. The output-side end unit 620 includes a power supply module that generates direct current of a predetermined voltage as needed.

The optical fiber cable 200A has an electrically insulating property of not conducting electricity in its longer direction. More specifically, the optical fiber cable 200A is made of electrically insulating substances only, from the optical fiber 250A, which includes a core and a cladding, to the outer face of the cladding to a protective layer to the exterior face. Although in a common cable, a metal layer may be arranged as a protective layer or the like, the optical fiber cable 200A is not configured as such.

Thus, the optical fiber cable 200A has the electrically insulating property of not conducting electricity in its longer direction, namely, has an electrically insulating property of insulating electric current in its longer direction.

Figure 6:
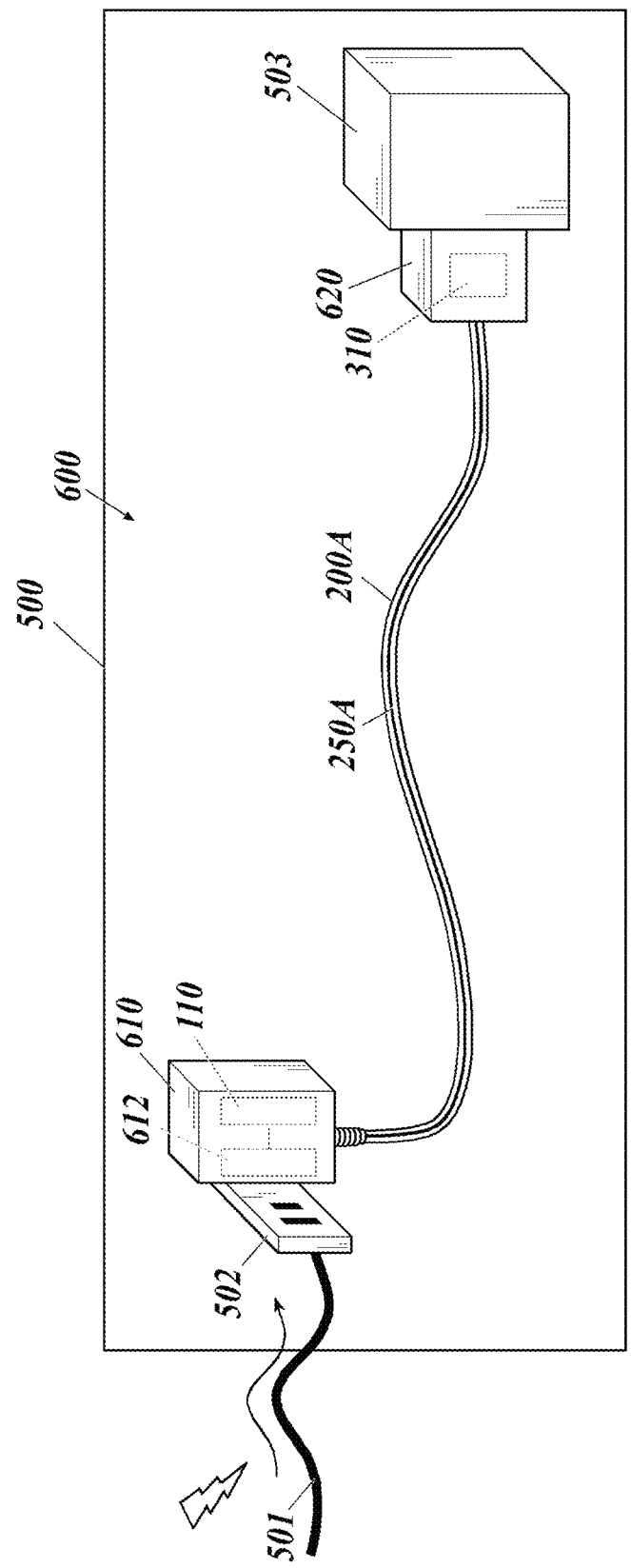
FIG. 6 is a schematic view of the optical transmission power supply cable being used indoors, showing its connected state to the AC outlet.

The optical transmission power supply cable 600 thus configured is used to connect the AC outlet 502 and the electrical device 503 as shown in FIG. 6.

This enables the electrical device 503 to be used.

In this connected state, even if lightning surge due to lightning strike or the like is conducted to the AC outlet 502 and the electric power input terminal 611, the electricity does not pass through the optical fiber cable 200A, namely, is insulated by the optical fiber cable 200A, so that the electrical device 503 at the power receiving side, which receives energy supply by feed light, can be protected.

Further, since energy is supplied through the optical fiber 250A, the cable 200A can be smaller in diameter than an electrical cable, thereby being able to reduce a wiring space.

The electric power input terminal 611 and the power sourcing equipment 110 are integrated and disposed at the input-side end, which can make a section where energy is transmitted through the optical fiber cable 200A long, thereby being able to enhance the electrically insulating property. Not being limited thereto, the electric power input terminal 611 and the power sourcing equipment 110 may be connected by an electrical cable. A length for sufficient electrical insulation can be secured by the optical fiber cable.

The powered device 310 may be incorporated in the electrical device 503 that uses electric power into which the powered device 310 has converted feed light. That is, the output-side end unit 620 is incorporated, as a part, in the electrical device 503.

Figure 7:
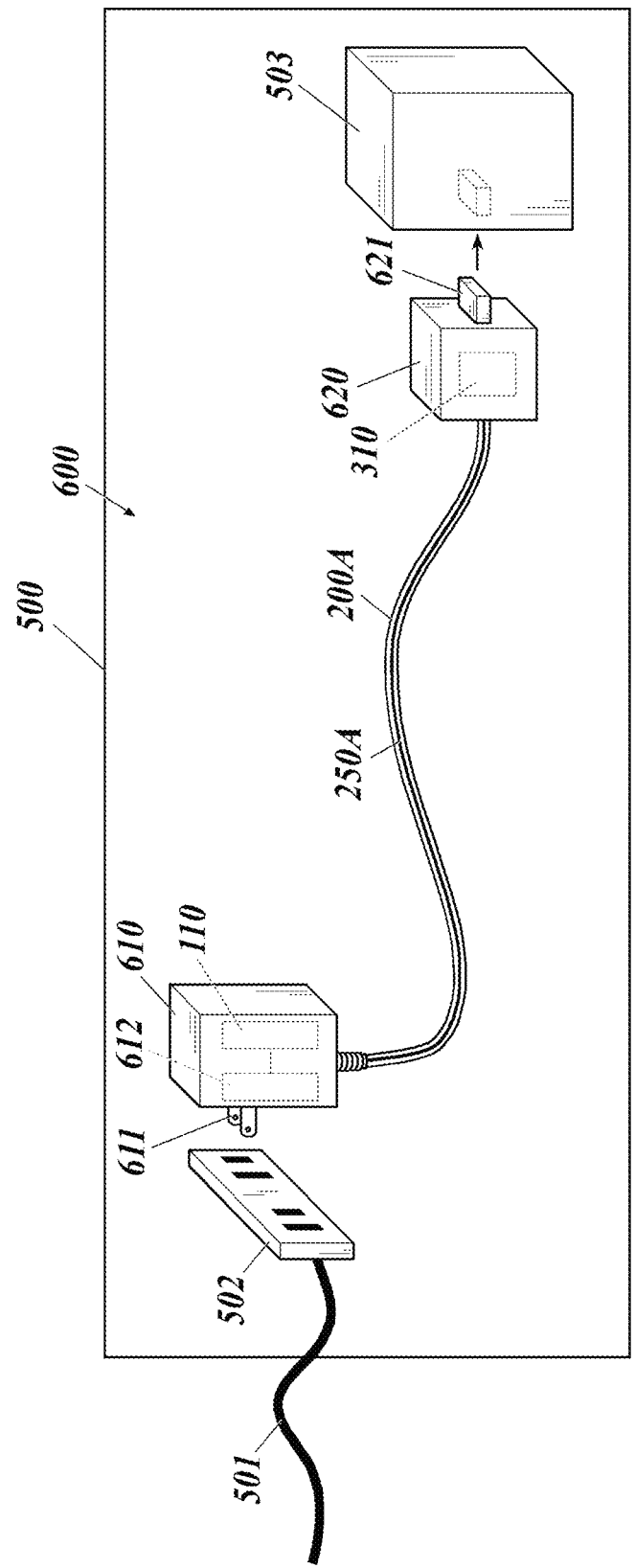
FIG. 7 is a schematic view of the optical transmission power supply cable being used indoors, showing its unconnected state to the AC outlet and an electrical device.

Alternatively, as shown in FIG. 7, an electrical connector 621 connectable to the electrical device 530 that uses electric power into which the powered device 310 has converted feed light may be included in the output-side end unit 620. In this case, the optical transmission power supply cable can be introduced to an electrical device that does not have an input port for feed light. This can eliminate the need to produce an electrical device in which the powered device 310 that converts feed light into electric power is incorporated, and introduce the optical transmission power supply cable economically.

Although some embodiments of the present disclosure have been described above, these embodiments are made for purposes of illustration and example only. The present invention can be carried out in various other forms, and each component may be omitted, replaced or modified/changed within a range not departing from the scope of the present invention.

INDUSTRIAL APPLICABILITY

The present invention is applicable to an optical transmission power supply cable.

The invention claimed is:

1. An optical transmission power supply cable, comprising:
   an input-side end including
      an electric power input terminal configured to connect to an alternating current source,
      a power sourcing equipment including a semiconductor laser configured to oscillate with electric power input from the electric power input terminal, thereby outputting feed light, and
      an electric power converter configured to convert alternating current power input through the electric power input terminal into direct current power to drive the power sourcing equipment;
   an output-side end including
      a powered device including a photoelectric conversion element configured to convert the feed light output by the power sourcing equipment into the direct current power, wherein the powered device is configured to output the direct current power, and
      an electrical connector configured to connect to a device that uses the direct current power converted from the feed light by the powered device; and
   an optical fiber cable extending between the input-side end and the output-side end, and configured to transmit the feed light from the power sourcing equipment to the powered device, wherein
   the optical fiber cable has an electrically insulating property of not conducting electricity in a longer direction thereof,
   the optical fiber cable is made of an electrically insulating substance only, from an optical fiber including a core and a cladding to an outer face of the cladding to a protective layer to an exterior face of the optical fiber cable,
   a semiconductor material of a semiconductor region of the photoelectric conversion element, the semiconductor region exhibiting a light-electricity conversion effect, is a laser medium having a laser wavelength of 500 nm or less, and
   the optical fiber cable is configured to transmit power only, without transmitting signals other than the feed light.

2. The optical transmission power supply cable according to claim 1, wherein
   the electric power input terminal and the power sourcing equipment are integrated and disposed at the input-side end.

3. The optical transmission power supply cable according to claim 1, wherein
   a semiconductor material of a further semiconductor region of the semiconductor laser, the further semiconductor region exhibiting a light-electricity conversion effect, is a laser medium having a laser wavelength of 500 nm or less.

4. The optical transmission power supply cable according to claim 1, wherein
   the electric power input terminal includes two prongs configured to be plugged into an outlet in a wall of a building.

5. The optical transmission power supply cable according to claim 1, wherein
   the electric power input terminal includes two prongs configured to be plugged into an outlet in a wall of a building, and
   the electric power input terminal and the power sourcing equipment are integrated and disposed at the input-side end.

6. An optical transmission power supply cable, comprising:
   an input-side end including
      an electric power input terminal configured to connect to an alternating current source,
      a power sourcing equipment including a semiconductor laser configured to oscillate with electric power input from the electric power input terminal, thereby outputting feed light, and
      an electric power converter configured to convert alternating current power input through the electric power input terminal into direct current power to drive the power sourcing equipment;
   a device configured to use the direct current power from the input-side end, the device includes
      a powered device including a photoelectric conversion element configured to convert the feed light output by the power sourcing equipment into the direct current power; and
   an optical fiber cable extending between the input-side end and the device, and configured to transmit the feed light from the power sourcing equipment to the powered device, wherein
   the optical fiber cable has an electrically insulating property of not conducting electricity in a longer direction thereof,
   the optical fiber cable is made of an electrically insulating substance only, from an optical fiber including a core and a cladding to an outer face of the cladding to a protective layer to an exterior face of the optical fiber cable,
   a semiconductor material of a semiconductor region of the photoelectric conversion element, the semiconductor region exhibiting a light-electricity conversion effect, is a laser medium having a laser wavelength of 500 nm or less, and
   the optical fiber cable is configured to transmit power only, without transmitting signals other than the feed light.

7. The optical transmission power supply cable according to claim 6, wherein
   the electric power input terminal includes two prongs configured to be plugged into an outlet in a wall of a building.

8. The optical transmission power supply cable according to claim 6, wherein
   the electric power input terminal includes two prongs configured to be plugged into an outlet in a wall of a building, and the electric power input terminal and the power sourcing equipment are integrated and disposed at the input-side end.

\* \* \* \* \*